(12) United States Patent
Inaba et al.

(10) Patent No.: US 10,839,691 B2
(45) Date of Patent: Nov. 17, 2020

(54) DRIVING ASSISTANCE APPARATUS, DRIVING ASSISTANCE SYSTEM, AND DRIVING ASSISTANCE METHOD

(71) Applicant: TOYOTA JIDOSHA KABUSHIKI KAISHA, Toyota (JP)

(72) Inventors: Chihiro Inaba, Tokyo (JP); Chikage Kubo, Chofu (JP); Keiko Nakano, Kawasaki (JP); Kazunari Nawa, Yokohama (JP); Hisakazu Hada, Fujisawa (JP); Emi Seki, Kawasaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/566,045

(22) Filed: Sep. 10, 2019

(65) Prior Publication Data

US 2020/0160714 A1 May 21, 2020

(30) Foreign Application Priority Data

Nov. 19, 2018 (JP) .................................. 2018-216839

(51) Int. Cl.
*G08G 1/16* (2006.01)
*H04W 4/46* (2018.01)
*H04W 4/44* (2018.01)
*B60Q 9/00* (2006.01)

(52) U.S. Cl.
CPC ............ *G08G 1/166* (2013.01); *B60Q 9/008* (2013.01); *G08G 1/162* (2013.01); *H04W 4/44* (2018.02); *H04W 4/46* (2018.02)

(58) Field of Classification Search
CPC ......... G08G 1/166; G08G 1/162; H04W 4/46; H04W 4/44; G02B 27/01

USPC .......................................................... 340/435
See application file for complete search history.

(56) References Cited

U.S. PATENT DOCUMENTS

| 7,792,641 | B2 * | 9/2010 | Liu | G08G 1/166 340/436 |
| 7,924,146 | B2 * | 4/2011 | Seder | H04N 7/18 340/435 |
| 8,384,531 | B2 * | 2/2013 | Szczerba | G01S 13/87 340/435 |

(Continued)

FOREIGN PATENT DOCUMENTS

| JP | 2004-161126 A | 6/2004 |
| JP | 2012-068754 A | 4/2012 |

OTHER PUBLICATIONS

"Drive Support Illumination" News, Denso Corporation, Dec. 14, 2015, pp. 1-2.

*Primary Examiner* — John A Tweel, Jr.
(74) *Attorney, Agent, or Firm* — Oliff PLC

(57) ABSTRACT

A driving assistance apparatus includes a memory and a processor having hardware. The processor is configured to acquire behavior prediction information of a moving object within a predetermined range centered on a subject vehicle to which driving assistance is applied, predict behavior content of the moving object within the predetermined range based on the acquired behavior prediction information of the moving object, and output a notification of an alert level corresponding to the predicted behavior content of the moving object at an edge of a windshield corresponding to a side on which the moving object, the behavior content of which has been predicted, exists, with respect to the position of a driver.

16 Claims, 8 Drawing Sheets

(56) References Cited

U.S. PATENT DOCUMENTS

| | | | | |
|---|---|---|---|---|
| 8,395,529 B2* | 3/2013 | Seder | ............... | G08G 1/0962 |
| | | | | 340/905 |
| 9,505,413 B2* | 11/2016 | Laine | ............... | B60W 50/14 |
| 2019/0351823 A1* | 11/2019 | Van Der Meijs | ...... | B60Q 9/008 |

* cited by examiner

FIG. 6A

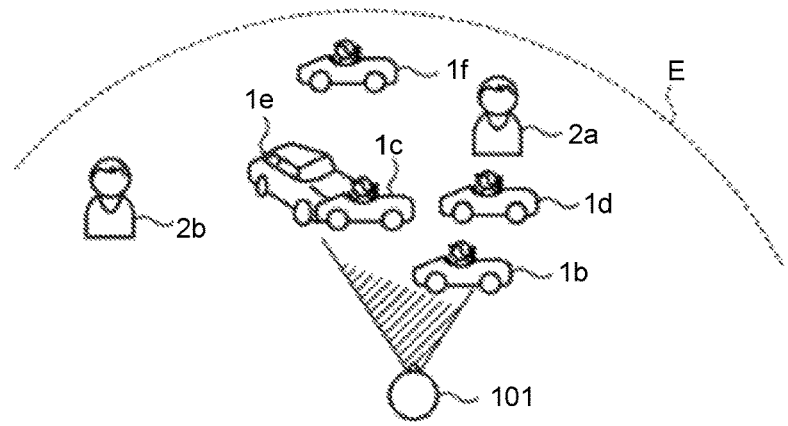

FIG. 6B

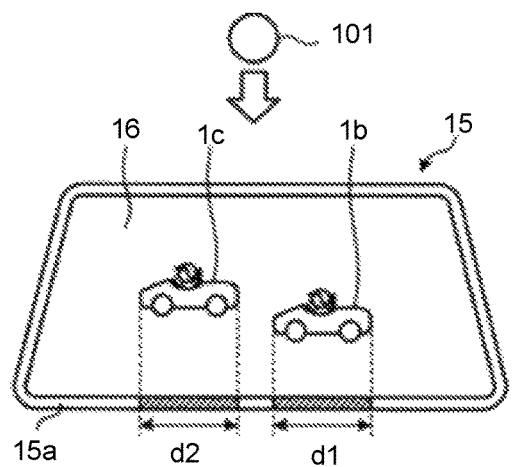

FIG. 7

| MOVING OBJECT | BEHAVIOR PREDICTION CONTENT | ALERT LEVEL | NOTIFICATION CONTENT |
|---|---|---|---|
| VEHICLE ON EITHER SIDE | ANOTHER VEHICLE AVOIDS WHEN MERGING | MIDDLE | YELLOW |
| VEHICLE ON EITHER SIDE | ANOTHER VEHICLE IS PRIORITIZED WHEN MERGING | HIGH | RED |
| VEHICLE AHEAD | DO NOT CHANGE LANES | LOW | GREEN |
| VEHICLE AHEAD | CHANGE LANES | HIGH | RED |
| PEDESTRIAN | DO NOT CROSS | MIDDLE | YELLOW |
| PEDESTRIAN | CROSS ROAD | HIGH | RED |
| ⋮ | ⋮ | ⋮ | ⋮ |

DRIVING ASSISTANCE APPARATUS, DRIVING ASSISTANCE SYSTEM, AND DRIVING ASSISTANCE METHOD

INCORPORATION BY REFERENCE

The disclosure of Japanese Patent Application No. 2018-216839 filed on Nov. 19, 2018 including the specification, drawings and abstract is incorporated herein by reference in its entirety.

BACKGROUND

1. Technical Field

The present disclosure relates to a driving assistance apparatus, a driving assistance system, and a driving assistance method.

2. Description of Related Art

Japanese Unexamined Patent Application Publication No. 2012-68754 (JP 2012-68754 A) discloses a vehicle driving assistance device that displays, with a light-emitting body such as an LED, the direction of an object such as a pedestrian to which a driver needs to pay attention according to the level of a possibility that the object may get in the way of a driver's vehicle, using a distance measuring device in the vehicle that transmits an infrared laser, a millimeter-wave, or the like.

Further, Japanese Unexamined Patent Application Publication No. 2004-161126 (JP 2004-161126 A) discloses a vehicle monitoring device that makes an illuminator arranged at a side on which a person or an obstacle exists to emit light, among a plurality of illuminators arranged in a driver's field of vision when the pedestrian or the obstacle is detected by a camera capturing the front view from a vehicle.

SUMMARY

However, technologies disclosed in JP 2012-68754 A and JP 2004-161126 A, determine, based on current information detected by a sensor of a subject vehicle, such as a distance from the subject vehicle to a detected object or the relative velocity of the detected object, whether a behavior of the pedestrian or another vehicle is an object to be alerted. Thus, with the technologies, it has been difficult to accurately estimate a possibility of a collision in the future between the subject vehicle and the pedestrian, or the another vehicle.

For example, when a pedestrian walking near a crosswalk is waiting for a taxi, there has been a possibility that the pedestrian is determined as an object that needs a high level of alert, and an alarm, such as a light emission, is set off even though the pedestrian has no intention to cross the road. In addition, when another vehicle changes course or cuts in the lane of the subject vehicle from another lane, there has been a possibility that another vehicle is determined as an object that needs a high level of alert even though the driver of the another vehicle is trying to give way to the subject vehicle, and an alarm is set off.

In other words, technologies disclosed in JP 2012-68754 A and JP 2004-161126 A determine a level of alert based only on the current information detected by the sensor of the subject vehicle, without taking into consideration the behavior intention of a pedestrian or another vehicle. Therefore, a high level of alert has been issued to a driver, even for an object that needs a low level of alert, and thus, a level of assistance for the driver has been low when determining a level of alert.

The present disclosure provides a driving assistance apparatus, a driving assistance system, and a driving assistance method that can issue an alert with a high accuracy of an alert level determination by further considering the behavior intention of another vehicle or a pedestrian.

A driving assistance apparatus according to a first aspect of the present disclosure includes a memory and a processor having hardware. The processor is configured to acquire behavior prediction information of a moving object within a predetermined range centered on a subject vehicle to which driving assistance is applied, predict behavior content of the moving object within the predetermined range based on the acquired behavior prediction information of the moving object, and output a notification of an alert level corresponding to the predicted behavior content of the moving object at an edge of a windshield corresponding to a side on which the moving object, the behavior content of which has been predicted, exists, with respect to a position of a driver.

Further, the processor may output the notification of the alert level that is determined to correspond to the predicted behavior content of the moving object and the behavior prediction information of the subject vehicle.

With the above aspect, since the behavior prediction information of the subject vehicle is added to the behavior content of the moving object within the predetermined range in determining the alert level, it is possible to alert a driver with an alert level which is determined with higher accuracy.

Moreover, the behavior prediction information may include a combination of one or more of (i) predicted route information and (ii) priority setting information at a time when the subject vehicle merges into another lane, along with position information of the subject vehicle.

With the above aspect, since it is possible to execute a negotiation with another moving object based on information on a specific behavior prediction of another moving object, it is possible to alert a driver with an alert level which is determined with higher accuracy.

In addition, the behavior prediction information may include information acquired via an external network including a mobile phone network, and/or information acquired via inter-vehicle communication, road-to-vehicle communication, and a sensor of the subject vehicle.

With the above aspect, since it is possible to acquire the behavior prediction information of the subject vehicle via its sensor, as well as the behavior prediction information of the moving object within the predetermined range via indirect communication through an external network including a mobile phone network, and direct communication, such as inter-vehicle communication and road-to-vehicle communication, it is possible to alert a driver with an alert level which is determined with higher accuracy.

Further, the processor may exclude, when there is a moving object hidden by another moving object among moving objects within the predetermined range, the hidden moving object from the moving objects to be predicted.

With the above aspect, since it is possible to simplify a notification output by a notification unit, driver distraction can be reduced.

Moreover, the processor may output, at a lower edge of the windshield, a notification on the moving object visible through the windshield.

The processor may output, at a right edge and a left edge of the windshield, the notification on hidden moving objects on a right side and a left side of the windshield, respectively.

With the above aspect, by outputting the notification only at the edge of the windshield, it is possible to spatially associate an alert with a moving object and perform the alert for a moving object within the predetermined range.

Further, the processor may output the notification on the moving object behind the subject vehicle at an upper edge of the windshield.

With the above aspect, by effectively utilizing the upper edge of the windshield, it is possible to alert a driver to the moving object behind the subject vehicle.

In addition, the notification output at the edge of the windshield may be output with a width corresponding to a size of the moving object.

With the above aspect, it is possible to perform the alert with the corresponding size of the moving object.

Further, the processor may output the notification of the alert level by emitting light in a manner of changing a color element of the light and/or a blinking interval of the light.

With the above aspect, since a driver is alerted by emitting light at the edge of the windshield in the manner of changing a light emitting operation, such as a color change and/or a light blinking interval, the driver can be provided with information while a wide view of the driver is secured.

In addition, the processor may output a specific notification that distinguishes a moving object of which the behavior prediction information is acquired from a moving object of which behavior prediction information is not acquired within the predetermined range.

With the above aspect, even when the moving object of which behavior prediction information is not acquired is mixed with the moving object of which the behavior prediction information is acquired, it is possible to easily distinguish the former from the latter.

A driving assistance system according to a second aspect of the present disclosure includes the driving assistance apparatus, a mobile terminal carried by a pedestrian, and a central server in a cloud. The driving assistance apparatus is mounted on a vehicle. The central server is configured to communicably connect the driving assistance apparatus and the mobile terminal, collect behavior prediction information from the driving assistance apparatus and the mobile terminal, and notify the driving assistance apparatus of the behavior prediction information.

With the above aspect, since the central server collectively manages behavior prediction information of a plurality of moving objects, it is possible to easily acquire the behavior prediction information within the predetermined range.

A driving assistance method according to a third aspect of the present disclosure is executed by a driving assistance apparatus. The driving assistance method includes a step of reading out, from a memory, behavior prediction information of a moving object within a predetermined range centered on a subject vehicle to which driving assistance is applied, a step of predicting behavior content of the moving object within the predetermined range based on the read-out behavior prediction information of the moving object; and a step of outputting the notification of the alert level corresponding to the predicted behavior content of the moving object at an edge of a windshield corresponding to a side on which the moving object, the behavior content of which has been predicted, exists, with respect to the position of a driver.

Further, the processor may further include a step of outputting the notification of the alert level that is determined to correspond to the predicted behavior content of the moving object and behavior prediction information of the subject vehicle.

With the above aspect, since the behavior prediction information of the subject vehicle is added to the behavior content of the moving object within the predetermined range in determination of the alert level, it is possible to perform the alert with the corresponding size of the moving object.

With each aspect of the present disclosure, behavior prediction information of a moving object within a predetermined range centered on a subject vehicle to which driving assistance is applied is acquired, the behavior content of the moving object within the predetermined range based on the acquired behavior prediction information of the moving object is predicted, and a notification of an alert level corresponding to the predicted behavior content of the moving object is output at the edge of a windshield corresponding to a side on which the moving object, the behavior content of which has been predicted, exists, with respect to the position of the driver. Therefore, it is possible to alert a driver to a moving object within the predetermined range by further considering an intention of a behavior of another vehicle or a pedestrian.

BRIEF DESCRIPTION OF THE DRAWINGS

Features, advantages, and technical and industrial significance of exemplary embodiments will be described below with reference to the accompanying drawings, in which like signs denote like elements, and wherein:

FIG. 6A is a diagram describing a hiding process on a moving object within a predetermined range;

FIG. 6B is a diagram describing a hiding process on a moving object within a predetermined range;

FIG. 7 is an exemplified notification table;

DETAILED DESCRIPTION OF EMBODIMENTS

Hereinafter, with reference to the drawings, a driving assistance apparatus, a driving assistance system, and a driving assistance method according to the present embodiment will be described.

Overview of Driving Assistance System

Figure 1:
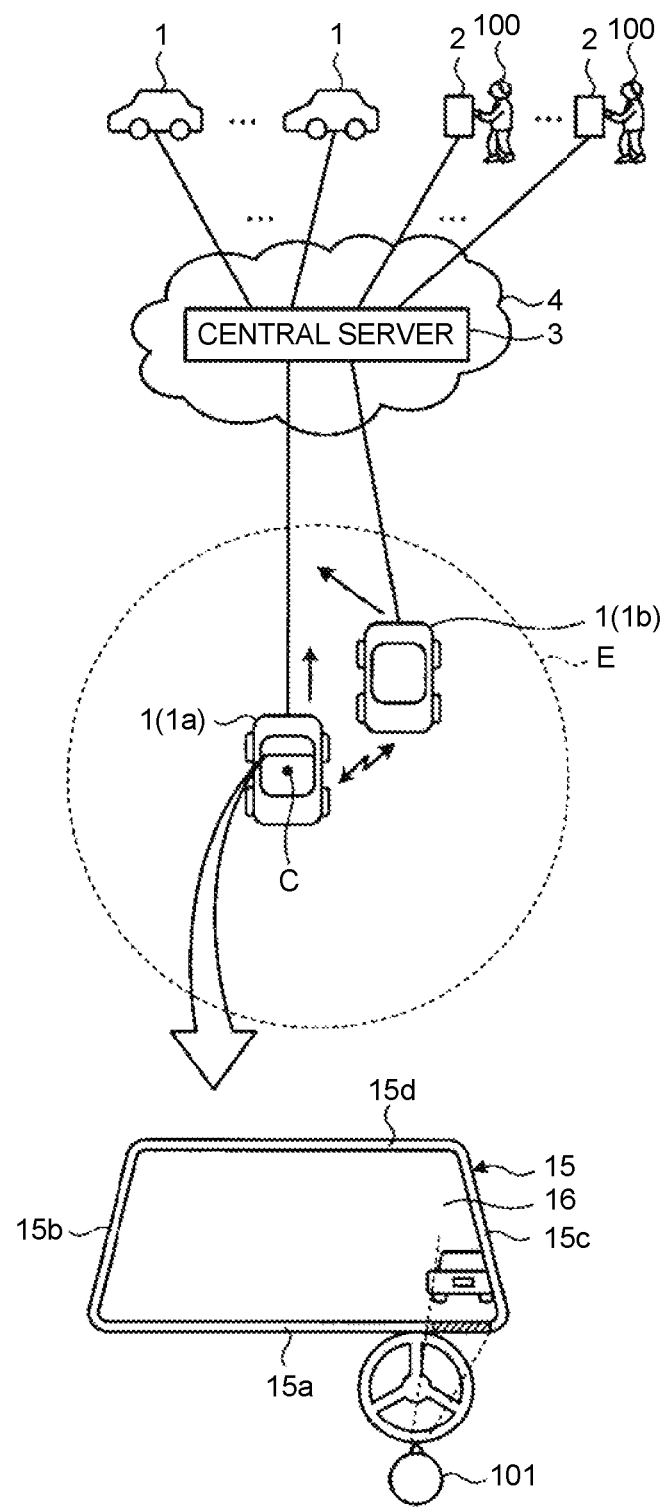
FIG. 1 is a diagram schematically illustrating a configuration of a driving assistance system according to the present embodiment.

FIG. 1 is a diagram schematically illustrating a configuration of a driving assistance system according to the present embodiment. As illustrated in FIG. 1, in the driving assistance system, a plurality of vehicles 1, as moving objects, and a plurality of mobile terminals 2 carried by a plurality of pedestrians 100, as moving objects, are connected to a central server 3 in a cloud 4. The vehicles 1, the mobile terminals 2, and the central server 3 may be connected via high-speed and large-capacity communication such as 5G mobile communication.

The plurality of vehicles 1 notifies the central server 3, in near real-time, of self-position information detected by a self-position detection device or the like, mounted on each vehicle 1, car navigation information in the processing content of a telematics terminal, detection information and determination information of advanced driver-assistance systems (ADAS), preset priority setting information, and the like, as transmission behavior prediction information. The priority setting information is a driving policy, and is information in which a priority level of a correspondence between the subject vehicle and another vehicle when merging into another lane, for example, whether to give way or pushing ahead is preset. In addition, the priority setting information may be information on a priority level acquired by learning a driving habit of the driver through machine learning, such as deep learning.

A plurality of mobile terminals 2 transmit, to the central server 3 in near real-time, position information of each mobile terminal 2 and behavior prediction information of a pedestrian being processed by each mobile terminal 2, as the transmission behavior prediction information.

In addition, each vehicle 1, for example, the vehicle 1a, acquires, from the central server 3, transmission behavior prediction information of the vehicle 1b and the mobile terminal 2, which are moving objects within a predetermined range E centered on the subject vehicle, as reception behavior prediction information. Further, the vehicle 1a can communicate with the vehicle 1b within the predetermined range E via inter-vehicle communication or road-to-vehicle communication, and receive the reception behavior prediction information from the vehicle 1b via inter-vehicle communication or road-to-vehicle communication. Moreover, the vehicle 1a acquires, as the reception behavior prediction information, the transmission behavior prediction information, such as the self-position information, the car navigation information in the processing content of the telematics terminal, the detection information and the determination information of the ADAS, the preset priority setting information, and information acquired by various sensors. In other words, the behavior prediction information includes the information acquired via the external network including the mobile phone network, and/or the information acquired via inter-vehicle communication, road-to-vehicle communication, and the sensor of the subject vehicle. Then, the vehicle 1a aggregates reception behavior prediction information received from the central server 3, reception behavior prediction information acquired via inter-vehicle communication or road-to-vehicle communication, and reception behavior prediction information detected by the subject vehicle, predicts the alert level for, for example, a collision with a moving object within the predetermined range E, and notifies a result of the prediction.

As illustrated in FIG. 1, the prediction result is notified by a notification unit 15 disposed at the edge of the windshield 16, corresponding to the side on which the moving object predicted, exists, with respect to the position of the driver 101. The notification unit 15 outputs the notification of the alert level corresponding to the predicted behavior content of the moving object spatially associated with the moving object. The notification unit 15 is disposed in a strip shape made of, for example, an LED array. The notification having a width corresponding to the size of a moving object on the windshield 16 visible through the windshield 16 is output to a notification unit 15a at the lower edge of the windshield 16. Further, the notification on hidden moving objects on the left side and the right side is output to a notification unit 15b at the left edge of the windshield 16 and a notification unit 15c at the right edge of the windshield, respectively. In addition, the notification on a moving object behind the subject vehicle is output to a notification unit 15d at the upper edge of the windshield 16. Since the notification is output at the edge of the windshield 16, driver distraction can be reduced.

Configuration of Driving Assistance Apparatus

Figure 2:
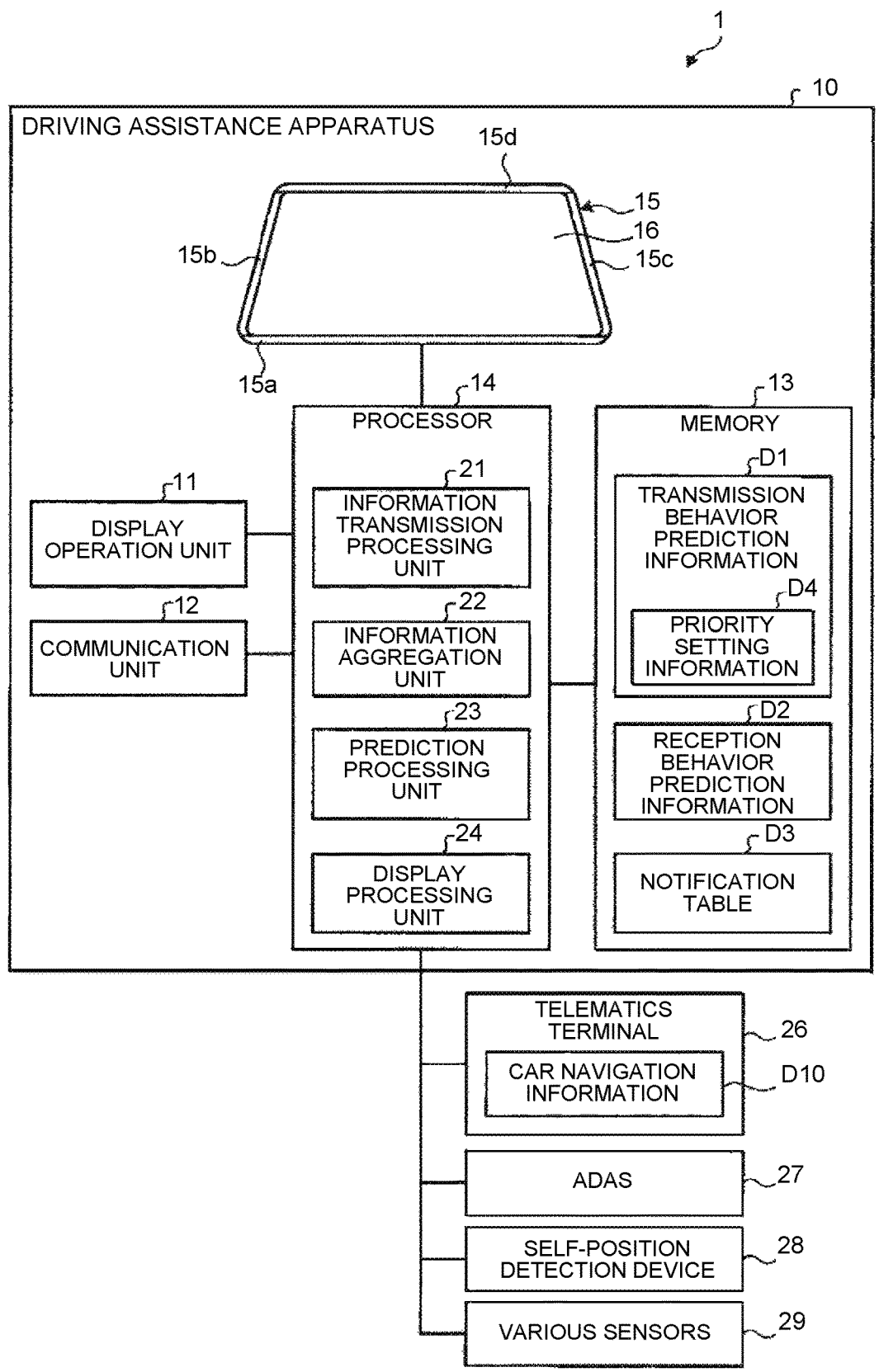
FIG. 2 is a block diagram illustrating a configuration of a driving assistance apparatus mounted on a vehicle.

FIG. 2 is a block diagram illustrating a configuration of the driving assistance apparatus 10 mounted on the vehicle 1. As illustrated in FIG. 2, the driving assistance apparatus 10 includes a display operation unit 11, a communication unit 12, a memory 13, a processor 14, and a notification unit 15.

The display operation unit 11 is an input and output interface, such as a touch panel liquid-crystal display or an organic EL display. The communication unit 12 is a communication interface that executes communication with the central server 3, inter-vehicle communication, road-to-vehicle communication, and communication with in-vehicle LAN, and the like.

The memory 13 is a storage device, consisting of a non-volatile memory, such as a flash memory, or a secondary storage medium, such as a hard disk drive, and the like. The memory 13 has transmission behavior prediction information D1 including priority setting information D4, reception behavior prediction information D2, and a notification table D3. The transmission behavior prediction information D1 is information on the behavior prediction of the subject vehicle. The reception behavior prediction information D2 is information on the behavior prediction of the vehicle 1 and the mobile terminal 2 within the predetermined range E. The notification table D3 stores the relationship between predicted behavior content determined from the behavior content of a moving object predicted based on the reception behavior prediction information D2 and the behavior prediction information of the subject vehicle, alert levels, and the notification content. In addition, the transmission behavior prediction information D1 and the reception behavior prediction information D2 include a combination of one or more of predicted route information and priority setting information D4 at the time of merging into the lane, along with the position information.

The processor 14 is a control unit that controls the overall driving assistance apparatus 10. The processor 14 includes an information transmission processing unit 21, an information aggregation unit 22, a prediction processing unit 23, and a display processing unit 24. In practice, programs corresponding to these functional units are stored in a memory 13, and a process corresponding to each of the information transmission processing unit 21, the information aggregation unit 22, the prediction processing unit 23, and the display processing unit 24 is executed when the programs are loaded and executed on a central processing unit (CPU). Further, the processor 14 may be implemented with an FPGA.

The processor 14 is connected with the telematics terminal 26 having the car navigation information, the ADAS 27, the self-position detection device 28 and various sensors 29. The processor 14 acquires, as the transmission behavior prediction information D1 of the subject vehicle, the car navigation information D10, the detection information and the determination information of the ADAS 27, the self-position information detected by the self-position detection device 28, and operation information and vehicle body information, which are detected by various sensors 29.

The information transmission processing unit 21 transmits the transmission behavior prediction information D1 to the central server 3, and transmits the transmission behavior prediction information D1 to another vehicle 1 via inter-vehicle communication or road-to-vehicle communication.

The information aggregation unit 22 aggregates, as the reception behavior prediction information D2, the transmission behavior prediction information D1 of another vehicle within the predetermined range E acquired through the central server 3, the transmission behavior prediction information D1 within the predetermined range E acquired via inter-vehicle communication or road-to-vehicle communication, and the transmission behavior prediction information D1 of the subject vehicle. Further, when there is a moving object hidden by another moving object within the predetermined range E viewed from the seat of the driver of the subject vehicle, the information aggregation unit 22 excludes the hidden moving object from moving objects to be predicted. With the exclusion of the hidden moving object, complication of the notification and driver distraction can be reduced.

The prediction processing unit 23 predicts the behavior content of the moving object within the predetermined range E, based on the reception behavior prediction information D2, and with reference to the notification table D3, determines the alert level corresponding to the predicted behavior content of the moving object, and the transmission behavior prediction information D1 of the subject vehicle. Further, the prediction processing unit 23 may determine the alert level based only on the predicted behavior content of the moving object without using the transmission behavior prediction information D1 of the subject vehicle.

The display processing unit 24 outputs the notification of the alert level determined by the prediction processing unit 23 at the notification unit 15.

Figure 3:
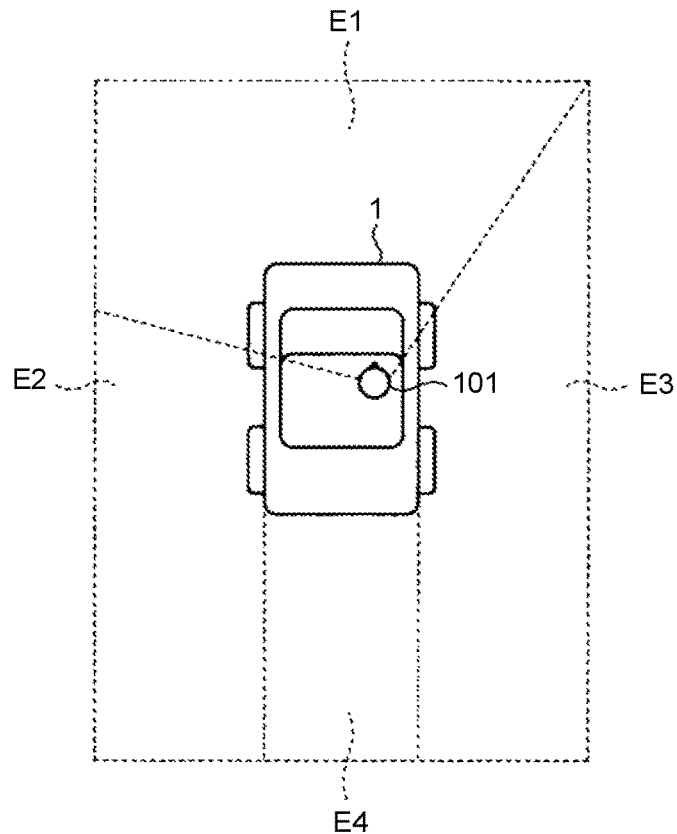
FIG. 3 is a diagram illustrating a correspondence between a notification unit provided on edges of a windshield and areas surrounding the vehicle.

The notification unit 15 is provided at the edge of the windshield 16. Specifically, the notification on a moving object in the frontal area E1 visible through the windshield 16, as illustrated in FIG. 3, is output to the notification unit 15a at the lower edge of the windshield 16. In addition, the notification on hidden moving objects in the area E2 on the left side and the area E3 on the right side is output to a notification unit 15b at the left edge of the windshield 16 and a notification unit 15c at the right edge of the windshield 16, respectively. Moreover, the notification on a moving object in the area E4 behind the vehicle 1 is output to a notification unit 15d at the upper edge of the windshield 16.

Configuration of Central Server

Figure 4:
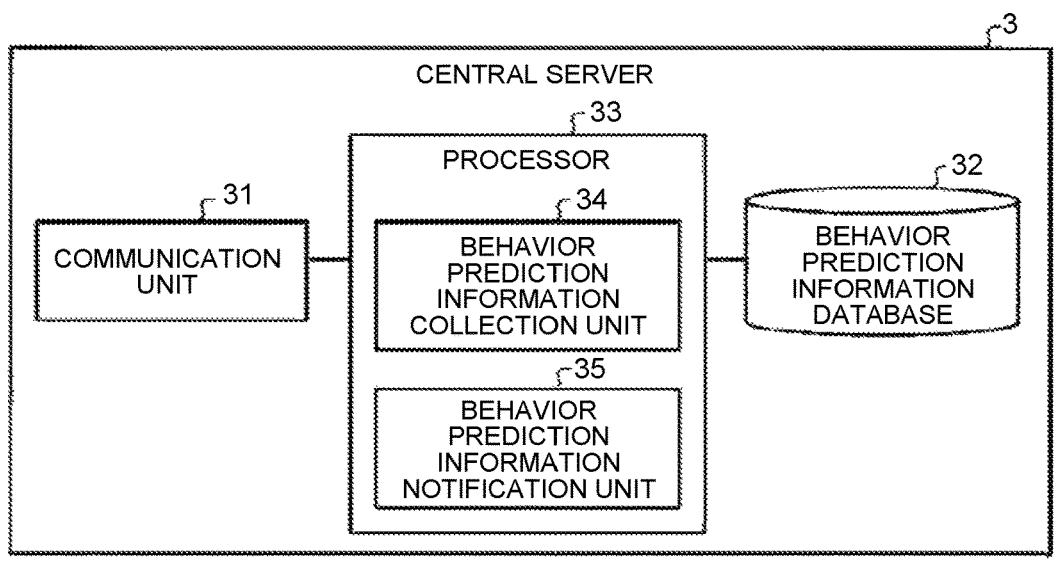
FIG. 4 is a block diagram illustrating a configuration of a central server.

FIG. 4 is a block diagram illustrating a configuration of the central server 3. As illustrated in FIG. 4, the central server 3 includes a communication unit 31, a behavior prediction information database 32, and a processor 33.

The communication unit 31 is an interface for communicating with each vehicle 1 and each mobile terminal 2, which are moving objects. The behavior prediction information database 32 stores and manages the transmission behavior prediction information D1 transmitted from each vehicle 1 and each mobile terminal 2.

The processor 33 is a control unit that controls the overall central server 3. The processor 33 includes a behavior prediction information collection unit 34 and a behavior prediction information notification unit 35. In practice, programs corresponding to these functional units are stored in a memory or a non-volatile memory (not shown), and a process corresponding to each of the behavior prediction information collection unit 34 and the behavior prediction information notification unit 35 is executed when the programs are loaded and executed on a central processing unit (CPU).

The behavior prediction information collection unit 34 manages the transmission behavior prediction information D1 by collecting the transmission behavior prediction information D1 of a moving object connected to the central server 3, and storing the transmission behavior prediction information D1 in the behavior prediction information database 32. The behavior prediction information notification unit 35 notifies each vehicle 1 of the transmission behavior prediction information D1 of a moving object within a predetermined range E of each vehicle 1.

Driving Assistance Processing by Processor of Driving Assistance Apparatus

Figure 5:
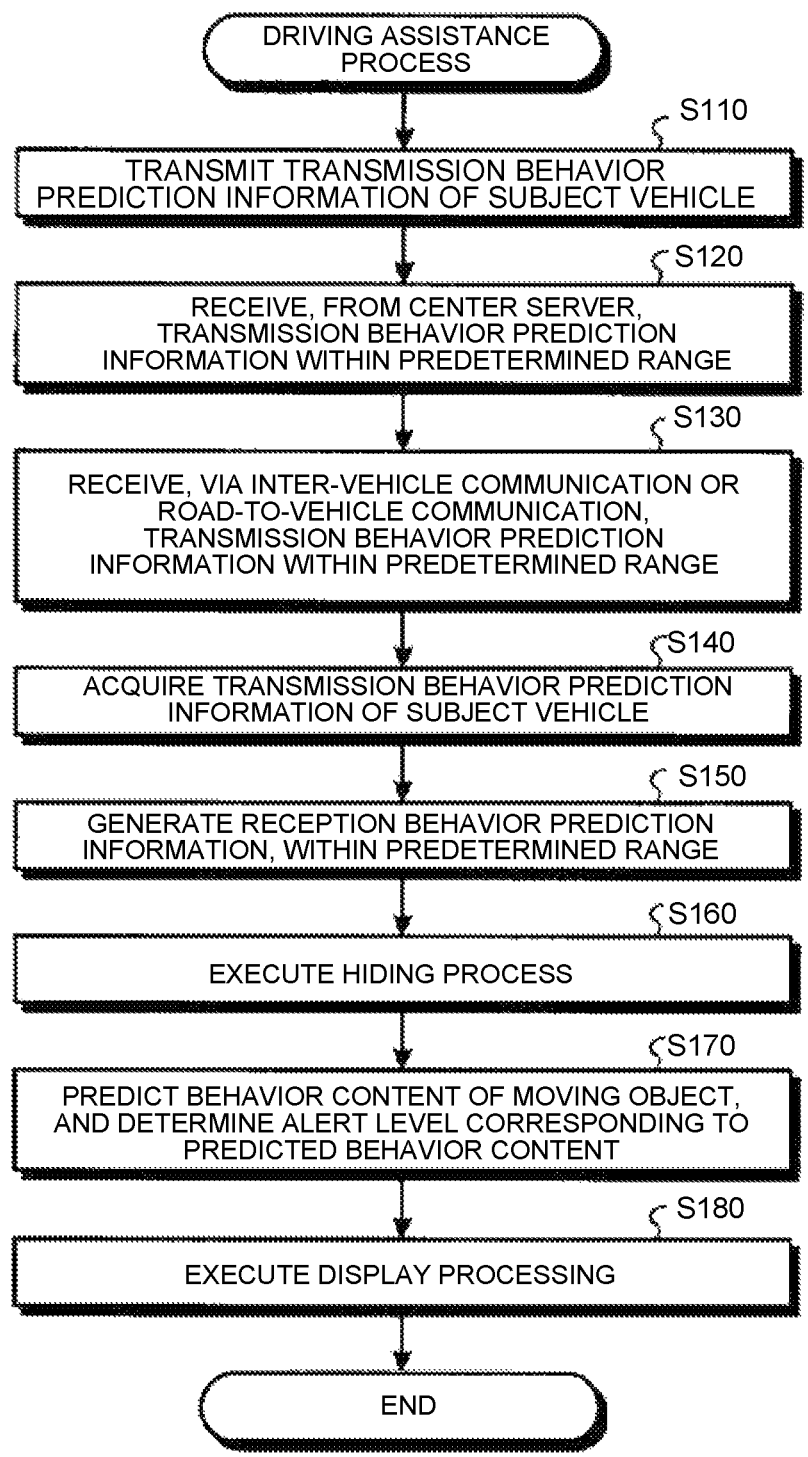
FIG. 5 is a flowchart illustrating a sequence of a driving assistance process, executed by a processor of the driving assistance apparatus.

FIG. 5 is a flowchart illustrating a sequence of a driving assistance process, executed by the processor 14 of the driving assistance apparatus 10. As illustrated in FIG. 5, the processor 14 first transmits, to the central server 3, the transmission behavior prediction information D1 of the subject vehicle (step S110). Then, the processor 14 receives, from the central server 3, the transmission behavior prediction information D1 of a moving object within a predetermined range E of the subject vehicle (step S120). Furthermore, the processor 14 receives the transmission behavior prediction information D1 of the moving object within the predetermined range E via inter-vehicle communication or road-to-vehicle communication (step S130). Thereafter, the processor 14 acquires the transmission behavior prediction information D1 based on sensor information of the subject vehicle (step S140). The sensor information of the subject vehicle includes the car navigation information D10, the detection information and the determination information of the ADAS 27, the self-position information by the self-position detection device 28, and the operation information and the state information detected by various sensors, and the like.

Then, the processor 14 generates the reception behavior prediction information D2, within the predetermined range E by aggregating the transmission behavior prediction information D1 acquired in steps S120 to S140 (step S150). After that, when there is a moving object hidden by another moving object within the predetermined range E viewed from the position of the driver, the processor 14 executes a hiding process that excludes the hidden moving object from moving objects to be predicted (step S160). In addition, even when a part of the moving object is hidden by another vehicle, the hidden moving object may be excluded.

For example, as illustrated in FIG. 6A, when there are vehicles 1b to 1f and pedestrians 2a and 2b as moving objects in a predetermined range E, the vehicle 1d and the pedestrian 2a are hidden by the vehicle 1b, and the vehicles 1e and 1f are hidden by the vehicle 1c, from the viewpoint of the driver 101 through the windshield 16. Thus, the vehicles 1d, 1e, and 1f, and the pedestrian 2a are excluded from moving objects to be predicted within the predetermined range E. As a result, as illustrated in FIG. 6B, notifications to only the vehicles 1b and 1c are output to the notification unit 15a at the edge of the windshield 16. In addition, the pedestrian 2b outside of the area visible through the windshield 16 is not excluded unless there is a moving object that hides the pedestrian 2b viewed from the position of the driver 101.

After that, based on the reception behavior prediction information D2 of the moving object which is left after the hiding process, the processor 14 predicts the behavior content of the moving object left in the predetermined range E, and with reference to the notification table D3, determines the alert level corresponding to the predicted behavior content (step S170). Then, the processor 14 executes a process of displaying the notification of the determined alert level (step S180), and ends the process.

In addition, as illustrated in FIG. 6B, notifications to the vehicles 1b and 1c, on the windshield 16, are output with widths d1 and d2 corresponding to the sizes of vehicles 1b and 1c, respectively.

One Example of Notification Table

FIG. 7 is a diagram illustrating an example of the notification table D3. As illustrated in FIG. 7, in the notification table D3, the items including the moving object, the predicted behavior content, the alert level, and the notification content are associated with one another. In the notification table D3 illustrated in FIG. 7, for example, when the moving object is a vehicle traveling on either side of the subject vehicle and the predicted behavior content is "another vehicle avoids when merging into a lane", the alert level is set to "middle" and the notification content is emitting a "yellow" light. "Avoiding" in the predicted behavior content means that the priority level set in the priority setting information D4 of another vehicle is low, and another vehicle "gives way" to the subject vehicle. The priority level, pre-set in the priority setting information D4, is, for example, "1", "2", or "3", and the priority level becomes higher in this order. When the priority level is "1", which is low, the behavior of another vehicle is prioritized. When the priority level is "3", which is high, the behavior of the subject vehicle is prioritized.

Therefore, in the above case, since the degree of danger for merging into another lane is high although the subject vehicle is prioritized, the alert level is set to "middle", and corresponding to the alert level, a "yellow" light is emitted.

On the other hand, when the priority level of the vehicle traveling on either side of the subject vehicle is "3" which is high, and the predicted behavior content is "prioritize another vehicle when merging into a lane", another vehicle is prioritized. Since the degree of danger for merging lanes is high, the alert level is set to "high", and corresponding to the alert level, a "red" light is emitted.

Similarly, when the predicted behavior content for the preceding vehicle is "do not change lanes" based on predicted route information indicated by the car navigation information D10 of the preceding vehicle, the alert level is set to "low", and corresponding to the alert level, a "green" light is emitted.

In addition, when the predicted behavior content for the preceding vehicle is "change lanes" based on the predicted route information indicated by the car navigation information D10 of the preceding vehicle, the degree of danger increases, the alert level is set to "high", and corresponding to the alert level, a "red" light is emitted.

Similarly, based on the information indicating that the pedestrian reserves a taxi via the mobile terminal 2 and is waiting for the taxi, when the predicted behavior content for the pedestrian is "do not cross." Since the pedestrian does not intend to cross the road, the alert level is set to "middle", and corresponding to the alert level, a "yellow" light is emitted.

Further, when there is no information indicating, for example, that the pedestrian is waiting for a taxi, or when there is information indicating that the pedestrian is heading to facilities across the road, the predicted behavior content for the pedestrian is "cross the road". Thus, the alert level is set to "high", and corresponding to the alert level, a "red" light is emitted.

Moreover, the priority level set in the priority setting information D4 and the alert level and the notification content of the notification table D3 may be further classified into multiple levels. In addition, although the notification content is color information, a change in a luminance level or a change in a light emitting operation, such as lighting and blinking intervals may be added to the color information. Further, a change in color information includes changes in color elements such as color, brightness, and saturation. Furthermore, a beep sound, voice guidance or the like may be added to the notification content as long as driver distraction is not increased.

First Specific Example of Driving Assistance Process

Figure 8:
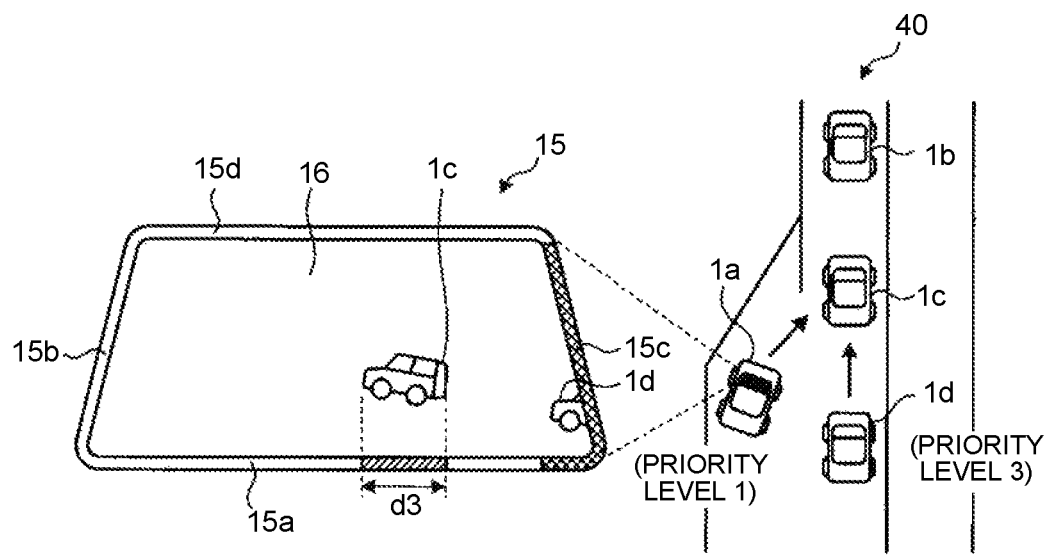
FIG. 8 is a first diagram describing a first specific example of the driving assistance process (part 1)

FIG. 8 is a diagram illustrating a first specific example of the driving assistance process. As illustrated in FIG. 8, the first specific example illustrates a case where the vehicle 1a merges into a priority road 40. When the vehicle 1a cuts in behind a vehicle 1c traveling on the priority road 40 and merges into the road, there is a possibility of a collision between the vehicle 1a with the vehicle 1d which is traveling immediately behind the vehicle 1c. When the priority level of the vehicle 1a is "1", which is low, and the priority level of the vehicle 1d is "3", which is high, the processor 14 predicts that it is necessary to prioritize a passage of the vehicle 1d. According to the predicted behavior content, the processor 14 determines that the alert level is "high". Furthermore, since the vehicle 1d is hidden on the right side of the windshield 16, the processor 14 emits a red light on the notification unit 15c on the right side in the notification unit 15. In addition, since the vehicle 1c traveling ahead of the vehicle 1d is already passing ahead of the vehicle 1a, the processor 14 determines that the alert level is "low" for the vehicle 1c. Furthermore, since the vehicle 1c is visible on the windshield 16, the processor 14 emits a green light on the notification unit 15a at the lower edge of the windshield 16, with a width d3 corresponding to the size of the vehicle 1c.

As described above, in the present embodiment, a complex negotiation executed by a human, such as passing, making an eye contact, and decelerating, can be smoothly executed between vehicles, using the pre-set priority setting information D4, and a result of the negotiation is output at the notification unit 15.

Figure 9:
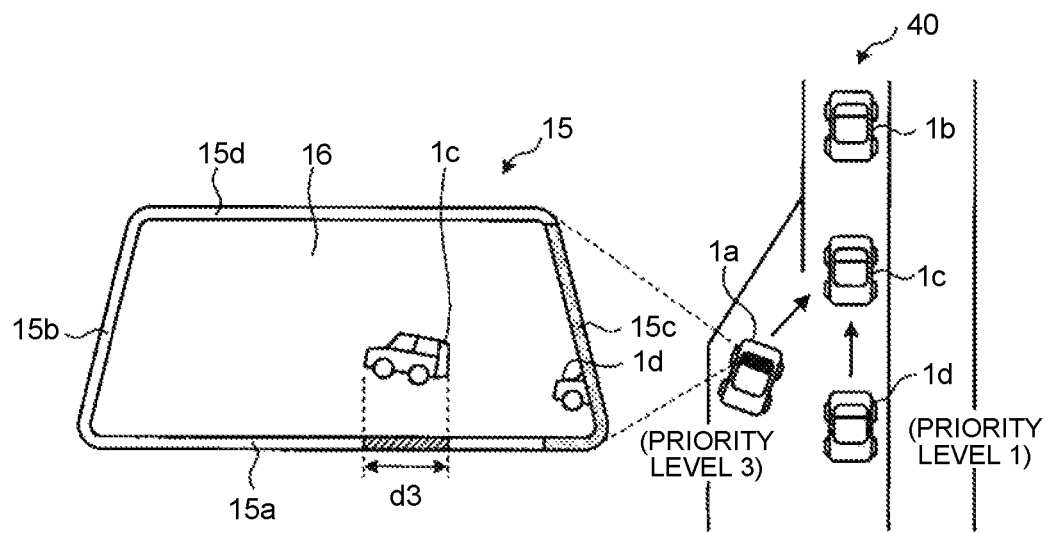
FIG. 9 is a second diagram describing the first specific example of the driving assistance process (part 2)

Moreover, as illustrated in FIG. 9, when the priority level of the vehicle 1a is "3" which is high, and the priority level of the vehicle 1d is "1" which is low, the processor 14 predicts that it is necessary to prioritize cutting in of the vehicle 1a over the passage of the vehicle 1d. Then, the processor 14 determines that the alert level is "middle" according to the predicted behavior content. Furthermore, since the vehicle 1d is hidden on the right side of the windshield 16, the processor 14 emits a yellow light on the notification unit 15c on the right side in the notification unit 15. In addition, since the vehicle 1c traveling ahead of the vehicle 1d is already passing ahead of the vehicle 1a, the processor 14 determines that the alert level is "low" for the vehicle 1c. Furthermore, since the vehicle 1c is visible on the windshield 16, the processor 14 emits a green light on the notification unit 15*a* at the lower edge of the windshield 16, with a width d3 corresponding to the size of the vehicle 1*c*.

Figure 10:
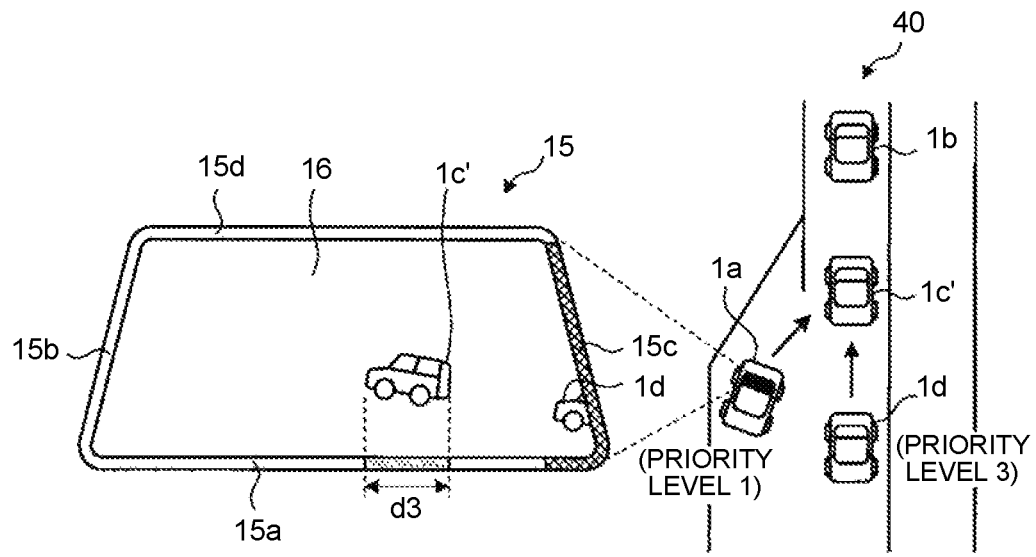
FIG. 10 is a third diagram describing the first specific example of the driving assistance process (part 3)

Here, as illustrated in FIG. 10, when the vehicle 1*c*' corresponding to the vehicle 1*c* has not joined the driving assistance system, the processor 14 emits a gray light with the width d3 corresponding to the size of the vehicle 1*c*' to the notification unit 15*a* at the lower edge of the windshield 16, and emits a gray light, which is a specific color information indicating that the vehicle has not joined the driving assistance system.

Second Specific Example of Driving Assistance Process

Figure 11:
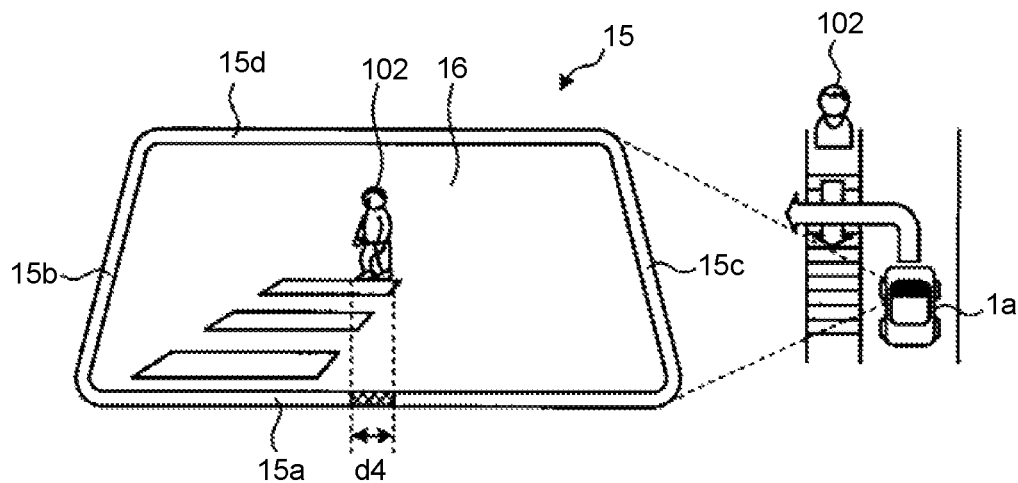
FIG. 11 is a diagram describing a second specific example of the driving assistance process.

FIG. 11 is a diagram illustrating a second specific example of the driving assistance process. As illustrated in FIG. 11, the second specific example illustrates a case where the vehicle 1*a* intends to turn left and pass a crosswalk, and a pedestrian 102 stands at the end of the crosswalk. When there is no behavior prediction in the reception behavior prediction information D2 on the pedestrian 102 as a moving object, the processor 14 predicts that the pedestrian 102 will cross the road. With reference to the notification table D3, the processor 14 determines that the alert level is "high" corresponding to the predicted behavior content. Furthermore, the processor 14 emits a red light on the notification unit 15*a* at the lower edge of the windshield 16, with a width d4 corresponding to the size of the pedestrian 102 based on the alert level.

In addition, when there is a behavior prediction such as waiting for a taxi in the reception behavior prediction information D2 of the pedestrian 102, the processor 14 predicts that the pedestrian 102 will not cross. Then, with reference to the notification table D3, the processor 14 determines that the alert level is "middle" according to the predicted behavior content. Furthermore, the processor 14 emits a yellow light on the notification unit 15*a* based on the alert level.

Third Specific Example of Driving Assistance Process

Figure 12:
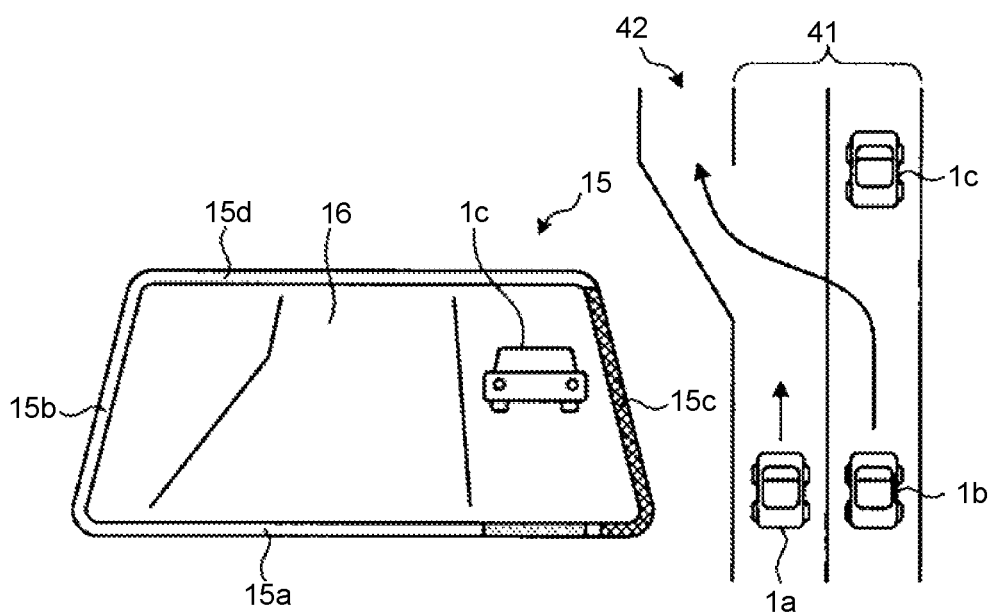
FIG. 12 is a diagram describing a third specific example of the driving assistance process.

FIG. 12 is a diagram illustrating a third specific example of the driving assistance process. As illustrated in FIG. 12, the third specific example illustrates a case where there is a branch lane 42 on a side of the traveling lane 41 ahead of the vehicle 1*a*, and the vehicle 1*b* traveling on the right side of the vehicle 1*a* intends to change lanes to the branch lane 42. In this case, the processor 14 acquires predicted route information of the vehicle 1*b* from the car navigation information D10 in the reception behavior prediction information D2 on the vehicle 1*b*. When the predicted route information indicates traveling on the branch lane 42, the processor 14 predicts that the vehicle 1*b* will change lanes to the left lane. Then, with reference to the notification table D3, the processor 14 determines that the alert level is "high" corresponding to the predicted behavior content. Furthermore, the processor 14 emits a red light on the notification unit 15*c* at the right edge of the windshield 16 based on the alert level.

Moreover, the processor 14 predicts that the vehicle 1*c* traveling ahead of the vehicle 1*b* will travel straight, and determines that the alert level is "low". Then, the processor 14 emits a green light on the notification unit 15*a* at the lower edge of the windshield 16 based on the alert level.

In addition to the predicted route information, the processor 14 may execute a negotiation between the vehicles 1*a* and 1*b*, using the priority setting information D4 between the vehicles 1*a* and 1*b*, and output a result of the negotiation on the notification unit 15.

Further, the above three specific examples are mere examples. For example, in a case where fuel detection information of another vehicle outputs an empty alarm, and there are gas station facilities or charging facilities nearby, the processor 14 may predict that the vehicle will travel to these facilities, and based on a result of the prediction, determine an alert level, and output the notification on the notification unit 15.

Moreover, in the third specific example, although the predicted route information of the car navigation information D10 is used, when, for example, the vehicle is traveling on the expressway for 2 hours or more, the processor 14 may predict that the vehicle will change lanes to stop by a service area. The same applies to a case where the processor 14 acquires information indicating that the passenger is searching for a service area, using the mobile terminal 2.

In any case, in the present embodiment, various kinds of information on the behavior prediction of the moving object within the predetermined range E is acquired in near real-time, and the alert level for the moving object is determined based on the acquired information or the acquired information to which the behavior prediction information of the subject vehicle is added. Then, the notification output of the determined alert level is executed.

In addition, in the present embodiment, the notification output is not limited to being based on the behavior prediction information, but may be combined with a notification output corresponding to the current alert level therewith. For example, when the preceding vehicle brakes or decelerates, a red light is emitted on the notification unit 15*a* as in the above cases.

Further, in the above embodiment, the notification unit 15*d* is provided at the upper edge of the windshield 16 to alert the driver to the rear area of the vehicle. However, the disclosure is not limited to the above case, and the notification unit 15*d* may not be provided.

Moreover, further effects or modifications can be easily derived by those skilled in the art. A broader aspect of the present disclosure is not limited to specific details and representative embodiments as described and shown above. Accordingly, various modifications may be made without departing from the scope of a general inventive concept as defined by appended claims and their equivalents.

What is claimed is:

1. A driving assistance apparatus comprising:
   a memory; and
   a processor having hardware,
   wherein the processor is configured to:
   acquire behavior prediction information of a moving object within a predetermined range centered on a subject vehicle to which driving assistance is applied;
   predict behavior content of the moving object within the predetermined range based on the acquired behavior prediction information of the moving object; and
   output a notification of an alert level taking into consideration the predicted behavior content of the moving object at an edge of a windshield corresponding to a side on which the moving object, the behavior content of which has been predicted, exists, with respect to a position of a driver, the alert level representing a likelihood of collision of the subject vehicle with the moving object,
   wherein the behavior prediction information includes information acquired via an external network including (a) a mobile phone network, and/or (b) information acquired via inter-vehicle communication, road-to-vehicle communication, and a sensor of the subject vehicle, and
   wherein (a) the mobile phone network is a network transmitting information relating to the moving object and/or (b) the information acquired via inter-vehicle communication includes information transmitted by the moving object.

2. The driving assistance apparatus according to claim 1, wherein the processor is configured to output the notification of the alert level that is determined to correspond to the predicted behavior content of the moving object and behavior prediction information of the subject vehicle.

3. The driving assistance apparatus according to claim 1, wherein the behavior prediction information includes a combination of one or more of (i) predicted route information and (ii) priority setting information at a time when the subject vehicle merges into another lane, along with position information of the subject vehicle.

4. The driving assistance apparatus according to claim 1, wherein the processor is configured to, when there is a moving object hidden by another moving object among moving objects within the predetermined range, exclude the hidden moving object from the moving objects to be predicted.

5. The driving assistance apparatus according to claim 1, wherein the processor is configured to output, at a lower edge of the windshield, the notification on the moving object visible through the windshield.

6. The driving assistance apparatus according to claim 5, wherein the processor is configured to output, at a left edge and a right edge of the windshield, the notification on hidden moving objects on a left side and a right side of the windshield, respectively.

7. The driving assistance apparatus according to claim 1, wherein the processor is configured to output, at a left edge and a right edge of the windshield, the notification on hidden moving objects on a left side and a right side of the windshield, respectively.

8. The driving assistance apparatus according to claim 5, wherein the processor is configured to output a notification on the moving object behind the subject vehicle at an upper edge of the windshield.

9. The driving assistance apparatus according to claim 5, wherein the notification output at the edge of the windshield is output with a width corresponding to a size of the moving object.

10. The driving assistance apparatus according to claim 1, wherein the processor is configured to output the notification of the alert level by emitting light in a manner of changing a color element of the light and/or a blinking interval of the light.

11. The driving assistance apparatus according to claim 1, wherein the processor is configured to output a specific notification that distinguishes a moving object of which the behavior prediction information is acquired from a moving object of which the behavior prediction information is not acquired, within the predetermined range.

12. A driving assistance system comprising:
the driving assistance apparatus according to claim 1;
a mobile terminal carried by a pedestrian; and
a central server in a cloud, wherein:
the driving assistance apparatus is mounted on a vehicle; and
the central server is configured to communicably connect the driving assistance apparatus and the mobile terminal, collect behavior prediction information from the driving assistance apparatus and the mobile terminal, and notify the driving assistance apparatus of the behavior prediction information.

13. The driving assistance apparatus according to claim 1, wherein the moving object is a pedestrian or another vehicle,
wherein in a case that the moving object is the pedestrian, the behavior prediction information includes information relating to a likelihood that the pedestrian will not cross the road, and
wherein in a case that the moving object is the another vehicle, the behavior prediction information includes information relating to a prioritizing of the another vehicle.

14. A driving assistance method executed by a driving assistance apparatus, the method comprising:
reading out, from a memory, behavior prediction information of a moving object within a predetermined range centered on a subject vehicle to which driving assistance is applied
predicting behavior content of the moving object within the predetermined range based on the read-out behavior prediction information of the moving object; and
outputting a notification of an alert level taking into consideration the predicted behavior content of the moving object at an edge of a windshield corresponding to a side on which the moving object, the behavior content of which has been predicted, exists, with respect to the position of a driver, the alert level representing a likelihood of collision of the subject vehicle with the moving object,
wherein the behavior prediction information includes information acquired via an external network including (a) a mobile phone network, and/or (b) information acquired via inter-vehicle communication, road-to-vehicle communication, and a sensor of the subject vehicle, and
wherein (a) the mobile phone network is a network transmitting information relating to the moving object and/or (b) the information acquired via inter-vehicle communication includes information transmitted by the moving object.

15. The driving assistance method according to claim 14, further comprising:
outputting the notification of the alert level that is determined to correspond to the predicted behavior content of the moving object and behavior prediction information of the subject vehicle.

16. The driving assistance method according to claim 14, wherein the moving object is a pedestrian or another vehicle,
wherein in a case that the moving object is the pedestrian, the behavior prediction information includes information relating to a likelihood that the pedestrian will not cross the road, and
wherein in a case that the moving object is the another vehicle, the behavior prediction information includes information relating to a prioritizing of the another vehicle.

* * * * *